(12) United States Patent
Kappel et al.

(10) Patent No.: US 10,554,519 B2
(45) Date of Patent: Feb. 4, 2020

(54) SYSTEM AND METHOD FOR DAMPENING POWER SWINGS IN DISTRIBUTED COMPUTER ENVIRONMENTS

(71) Applicant: Cray Inc., Seattle, WA (US)

(72) Inventors: Matthew Kappel, Chippewa Falls, WI (US); David Rush, Chippewa Falls, WI (US); Steve Martin, Chippewa Falls, WI (US); Jim Robanske, Chippewa Falls, WI (US)

(73) Assignee: CRAY INC., Seattle, WA (US)

( * ) Notice: Subject to any disclaimer, the term of this patent is extended or adjusted under 35 U.S.C. 154(b) by 103 days.

(21) Appl. No.: 15/018,823

(22) Filed: Feb. 8, 2016

(65) Prior Publication Data

US 2017/0230259 A1    Aug. 10, 2017

(51) Int. Cl.
  *H04L 12/26*    (2006.01)

(52) U.S. Cl.
  CPC .................................. *H04L 43/08* (2013.01)

(58) Field of Classification Search
  CPC ......... H04L 43/08; H04L 12/12; G06F 1/305; G06F 11/3062
  See application file for complete search history.

(56) References Cited

U.S. PATENT DOCUMENTS

| | | | |
|---|---|---|---|
| 7,002,265 B2 | 2/2006 | Potega | |
| 7,441,135 B1 * | 10/2008 | Chan | G06F 1/3203 713/320 |
| 7,783,886 B2 | 8/2010 | Walmsley | |
| 7,818,519 B2 | 10/2010 | Plunkett | |
| 8,335,224 B1 * | 12/2012 | Milliken | G06F 1/3275 370/428 |
| 8,595,515 B1 * | 11/2013 | Weber | G06F 1/3206 713/300 |
| 8,775,839 B2 | 7/2014 | Cousson et al. | |
| 8,904,209 B2 * | 12/2014 | Davis | G06F 1/3206 713/320 |
| 8,953,288 B2 | 2/2015 | Jankowski et al. | |
| 8,953,295 B2 | 2/2015 | Jankowski et al. | |
| 8,959,325 B2 | 2/2015 | Cook et al. | |
| 9,671,846 B1 * | 6/2017 | Davis | G06F 1/28 |
| 9,857,858 B2 * | 1/2018 | Bodas | G06F 1/3206 |
| 2003/0126253 A1 * | 7/2003 | Ewing | G06F 1/26 709/223 |
| 2004/0243978 A1 | 12/2004 | Walmsley | |

(Continued)

FOREIGN PATENT DOCUMENTS

| | | |
|---|---|---|
| CA | 2317560 A1 | 5/1999 |
| EP | 0701194 B1 | 3/1996 |

(Continued)

*Primary Examiner* — Blake J Rubin
(74) *Attorney, Agent, or Firm* — Hewlett Packard Enterprise Patent Department

(57) ABSTRACT

In a large scale computing system, a supervisory system is utilized to monitor the operations and requests of multiple components, and to manage such requests so that overall power considerations for the entire system are considered. The supervisory system has the ability to identify requests and aggregations of simultaneous requests that will create an adverse power effect, and to apply overall control methodologies which will help to minimize these adverse effects.

17 Claims, 5 Drawing Sheets

(56) References Cited

U.S. PATENT DOCUMENTS

| | | | |
|---|---|---|---|
| 2007/0168088 A1* | 7/2007 | Ewing | H02J 3/14 700/295 |
| 2007/0300083 A1* | 12/2007 | Goodrum | G06F 1/3203 713/300 |
| 2008/0040563 A1* | 2/2008 | Brittain | G06F 1/3225 711/154 |
| 2010/0021669 A1 | 1/2010 | Miyata et al. | |
| 2010/0052421 A1* | 3/2010 | Schindler | H02J 1/14 307/35 |
| 2010/0235654 A1* | 9/2010 | Malik | G06F 1/3209 713/300 |
| 2010/0235840 A1* | 9/2010 | Angaluri | G06F 1/329 718/102 |
| 2011/0082598 A1 | 4/2011 | Boretto et al. | |
| 2011/0235294 A1* | 9/2011 | Leverenz | H05K 7/1092 361/781 |
| 2011/0245988 A1* | 10/2011 | Ingels | G06F 1/26 700/295 |
| 2011/0301889 A1* | 12/2011 | Naffziger | G06F 1/206 702/62 |
| 2011/0302440 A1* | 12/2011 | DiMarco | G06F 1/26 713/340 |
| 2012/0054512 A1* | 3/2012 | Archibald | G06F 1/26 713/320 |
| 2012/0066519 A1* | 3/2012 | El-Essawy | H05K 7/1492 713/300 |
| 2012/0116590 A1* | 5/2012 | Florez-Larrahondo | G06F 1/206 700/275 |
| 2012/0185706 A1* | 7/2012 | Sistla | G06F 1/3203 713/300 |
| 2012/0194146 A1* | 8/2012 | Longacre | G06F 1/266 323/234 |
| 2013/0030734 A1* | 1/2013 | Ware | G01R 19/0084 702/62 |
| 2013/0080814 A1* | 3/2013 | Cong | G06F 1/3206 713/340 |
| 2013/0346736 A1 | 12/2013 | Cook et al. | |
| 2014/0047261 A1 | 2/2014 | Patiejunas et al. | |
| 2014/0075222 A1* | 3/2014 | Jackson | G06F 1/329 713/320 |
| 2014/0281616 A1* | 9/2014 | Moran | G06F 1/3243 713/323 |
| 2015/0006846 A1 | 1/2015 | Youngworth | |
| 2015/0058650 A1* | 2/2015 | Varma | G06F 1/3293 713/324 |
| 2015/0089249 A1* | 3/2015 | Hannon | G06F 9/5094 713/300 |
| 2015/0121113 A1* | 4/2015 | Ramamurthy | H02J 9/061 713/340 |
| 2015/0301914 A1* | 10/2015 | Phuong | G06F 1/26 713/322 |
| 2016/0011914 A1* | 1/2016 | Bohn | G06F 9/5094 713/300 |
| 2016/0085291 A1* | 3/2016 | Ebsen | G06F 1/3268 713/320 |
| 2016/0179157 A1* | 6/2016 | Ardanaz | G06F 1/325 713/340 |
| 2016/0187395 A1* | 6/2016 | Bodas | G01R 21/00 702/60 |
| 2016/0378610 A1* | 12/2016 | Allen-Ware | G06F 1/30 714/3 |
| 2017/0160787 A1* | 6/2017 | Wood | G06F 1/3218 |
| 2017/0310363 A1* | 10/2017 | Liu | G06F 1/18 |

FOREIGN PATENT DOCUMENTS

| | | |
|---|---|---|
| EP | 0780000 B1 | 6/1997 |
| EP | 1764618 B1 | 3/2007 |
| WO | 2010093549 A1 | 8/2010 |

\* cited by examiner

SYSTEM AND METHOD FOR DAMPENING POWER SWINGS IN DISTRIBUTED COMPUTER ENVIRONMENTS

BACKGROUND

Large computer systems or large computing installations typically include several components integrated with one another to cooperate in a combined manner. Physically, this often involves multiple cabinets (also referred to as "racks" by some organizations) in a large scale computing center, with each cabinet supporting several different computer cards. Each card may include a processor or multiple processors, and are typically networked with one another. As is well recognized, the individual processors are often referred to as nodes, with several nodes contained within various slots of a cabinet. In certain circumstances, and particularly in the high performance computing environment, the coordinated operation of these multiple nodes, slots, cabinets and/or systems will help the overall system operate more efficiently. As one example, system events typically need to be coordinated so the various nodes will cooperate in an effective manner.

While coordinated operation of large scale systems or large installations is necessary for effective operation, overall power control becomes a significant consideration which is not typically monitored. Often, a "power on" or "power off" cycle involves all components and/or processors transitioning from one power state to another. Most often, this is done simultaneously without concern for any potential adverse effects. Similarly, system boot up operations (which often requires additional processing power) are also often carried out without concern for collective adverse effects. When multiple systems are involved however, especially large scale systems involving many different cabinets, card slots, processors, etc., the overall cumulative power effects can be significant.

As will be appreciated, rapid increases or decreases in power consumed by large scale systems can cause problems. Due to the number of systems involved, the collective effect can create megawatt-scale power fluctuation in very short periods of time (e.g. multi-megawatt changes in less than a second). This has the potential to create problems in the local power systems, the infrastructure (e.g. cooling systems), the power grid, and with other power related systems. In some instances, this negatively affects economic conditions as well when the power utility company can potentially increase rates for high power demand customers, or a violation of the customer/utility power contract may be created. Related stresses on the power infrastructure can also cause service failures, power outages, and other negative effects. These problems are largely due to the inability of the power system to handle large swings or large fluctuations in a power demand in a very short period of time. In some instances, this may include multi-megawatt fluctuations in minutes or seconds. Again, this potential for rapid increases or decreases in power demand typically occurs in large installations or large systems due to the number of components involved. These problems may not be readily apparent since individual processor or individual system operations are often considered in isolation. As such, there is a need to consider the cause of power swings and the cumulative effects in large scale systems.

In many instances, software entities control power to some level or some degree. Again, individually this is very acceptable and does not create issues. That said, the collective effect in large scale systems can be detrimental and undesirable. This is especially true when no overall system control is provided. Due to the typical operation of these software entities, this often creates bulk changes in component power states, thus generating significant power swings. Examples of this include the power cycling of all nodes at one particular time, the simultaneous powering of all slots, and/or the boot up of a majority of nodes. Again, in each of these instances, when considered in a large scale system has the potential to cause significant power swings in a very short period of time.

In light of the above recognized possibilities for severe power swings, there is thus a need to provide some level of oversight and overall coordination. More specifically, a supervisory system is necessary to coordinate the operations of a large scale computing systems to avoid undesirable operating conditions. Specifically, there is a need to avoid severe power swings and very significant changes in power consumption over short periods of time. This includes the need to avoid significant increases and/or decreases in power over short periods of time, since both can create problems.

SUMMARY

A supervisory system is implemented within a large scale computing installation to oversee operations from a power perspective. Generally speaking, the supervisory system implements oversight functions to avoid undesirable conditions, and specifically undesirable power usage conditions (it is appreciated that this supervisory system could be implemented as part of a more comprehensive monitoring system, or could be created as a stand-alone system). When a request is observed which will likely have an adverse effect on overall power consumption for the computing installation, the supervisory system will carry out steps to minimize these effects. In one example, the system will intervene and provide separation between several portions of the request, and coordinate operations so the requests are carried out over a period of time. In an alternative embodiment, the requests will be separated into different segments so each segment can be analyzed and carried out in the most efficient manner.

By providing the oversight function, the supervisory system can take steps to avoid adverse power effects without effecting the processing operations being completed. In most instances, this will involve controlled start-up, controlled power on, controlled shutdown, or controlled power transitions. Again, the adverse power effects are created by the collective efforts of multiple components. In many circumstances, the requests being made by various processes will not create a large adverse effect, and thus the supervisory system will not carry out any action.

DESCRIPTION OF THE DRAWINGS

Further advantages and objects of the disclosed embodiments can be seen from the following detailed description, in conjunction with the drawings, in which.

DESCRIPTION OF THE PREFERRED EMBODIMENTS

As mentioned above, large scale systems or large installations can create cumulative power effects which are undesirable and often times unanticipated. To illustrate this potential effect, a system which includes over 200 computing cabinets, and which contains over 9600 blades was analyzed to review the overall power consumption when certain actions were taken (in this context a blade component typically includes multiple compute nodes, with each compute node including multiple processors). As appreciated, this configuration creates significant numbers of independent systems, each of which can be independently operated, however must work in a cooperative manner. The results of selected collective operations are further outlined below.

Figure 3:
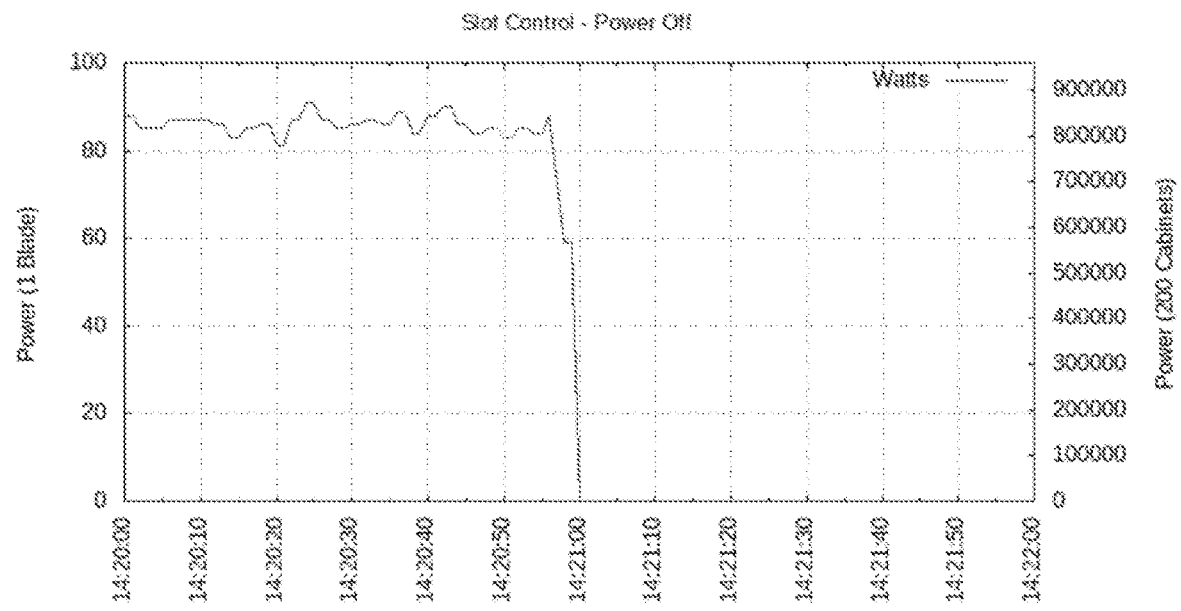
FIGS. 3 through 8 are graphical illustrations showing the power consumption characteristics of an example large scale installation when certain events occur.
Figure 4:
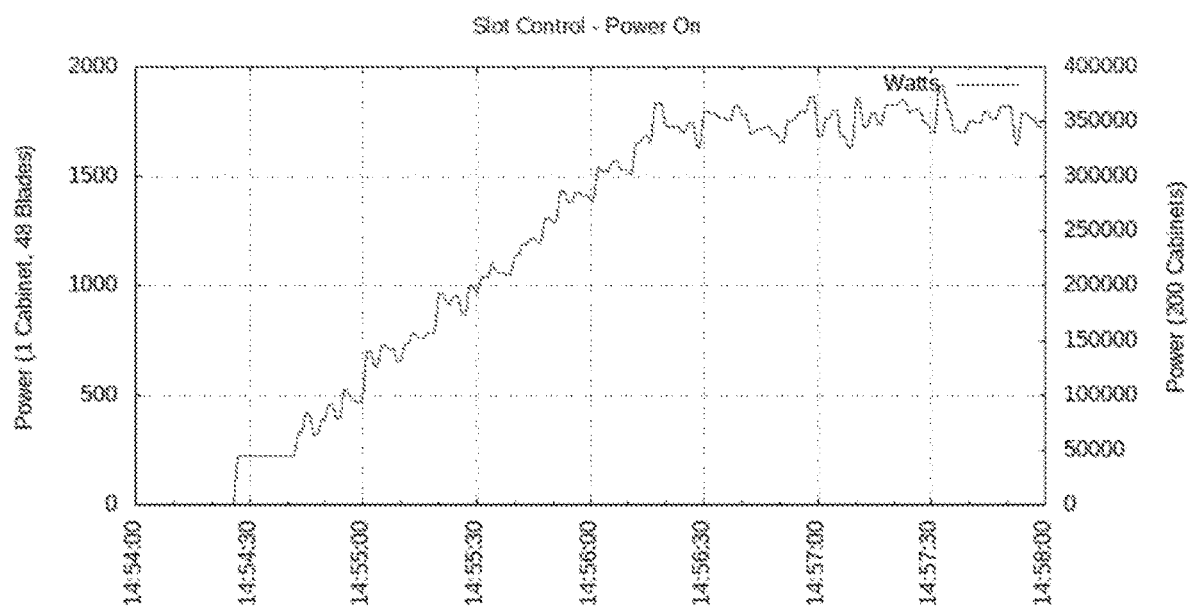

Referring now to FIGS. 3 and 4, the overall power consumption or power profile of the large scale system is illustrated, when all slots within a particular cabinet are both powered off (FIG. 3), and powered on (FIG. 4) at a particular point in time. More particularly, FIG. 3 illustrates the power profile for the system when all slots are powered off at particular times. In this figure, the calibration on the right hand side indicates the overall power consumption for the exemplary system mentioned above (which includes 200 cabinets). Similarly, the power for one blade is listed on the left of FIG. 3, while the relative power valve for each cabinet is listed on the left of FIG. 4. As illustrated, the system will transition from over 800 kilowatts to 0 in virtually no time (with the power for each blade dropping from approximately 85 watts to 0 nearly instantaneously).

FIG. 4 illustrates a similar concept, but showing a situation where all slots are powered on at one particular point in time. In this particular embodiment, one "slot" is also often referred to as a blade". As can be seen from this illustration, the overall system will transition from power off (or zero power), to over 350 kilowatts in approximately 2 minutes time (each cabinet transitioning from zero to over 1.7 kilowatts in this same time). From these illustrations, it can be clearly seen that the transitions of a single blade or a single cabinet may not be significant, but the collective effect of all systems together can be significant. Also, the transitions are very abrupt, occurring over a relatively short period of time.

Figure 5:
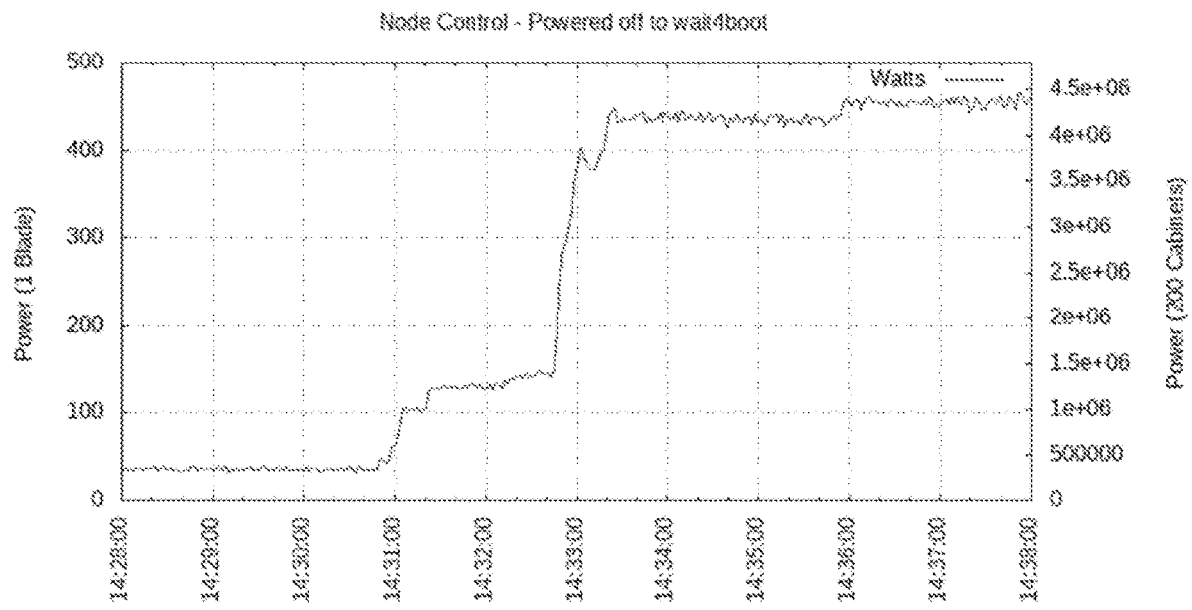

In operation, there are many different operating modes and scenarios which may be encountered in addition to those discussed above. For example, there are often certain instances where components are initialized, bringing the power up to a certain level, but, not necessarily booting all of the components to full operational state. Even this process can result in significant power demand when carried out in a larger scale system. As illustrated in FIG. 5. the power profile can also be concerning when certain controllers and circuits are initialized, but the operating nodes are waiting to boot up. For clarity, the particular embodiment here involves a single "blade", which includes four nodes. As can be seen, an initial power increase is first received when certain components and nodes are initially powered on (see e.g. time "14:31:00" in FIG. 5). Next, when node boot up processes are initiated, significant power demands are again seen (see time "14:33:00").

Figure 6:
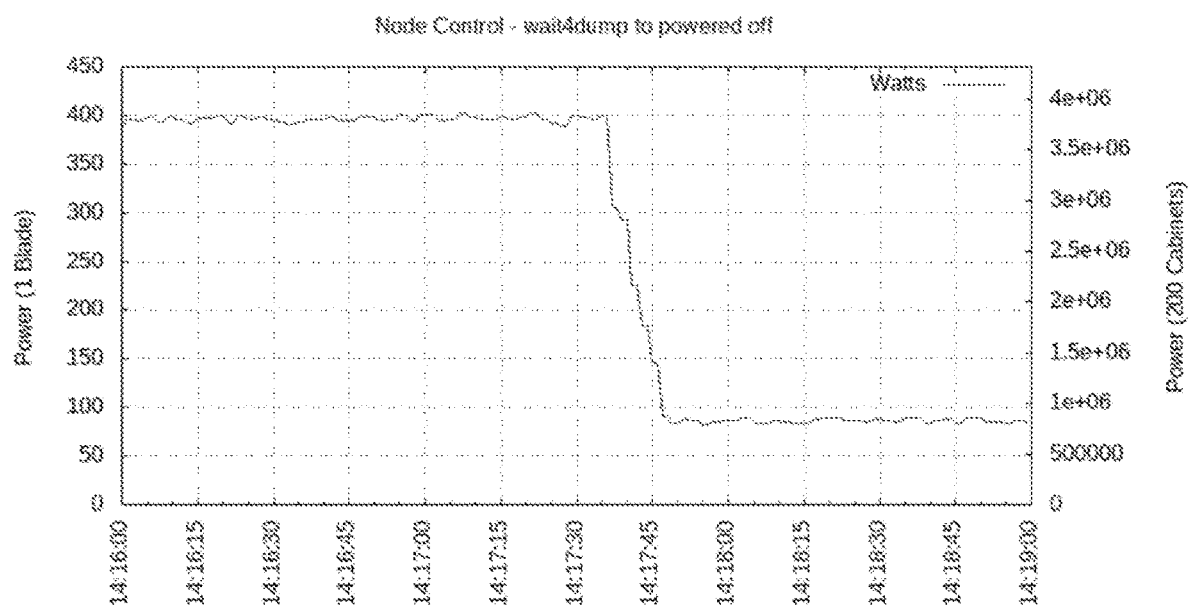

In a similar manner, powering down can create significant power transitions. FIG. 6 illustrates an example situation where all nodes are initially in a shutdown state but are then powered off. At the point where a power off command is generated (see time "14:17:36") the power consumption drops dramatically in a short period of time. The power consumption then settles out when all nodes are powered off. (Note that some remaining power consumption remains after this "power off" command due to certain controllers and peripheral components remaining powered for various purposes).

Figure 7:
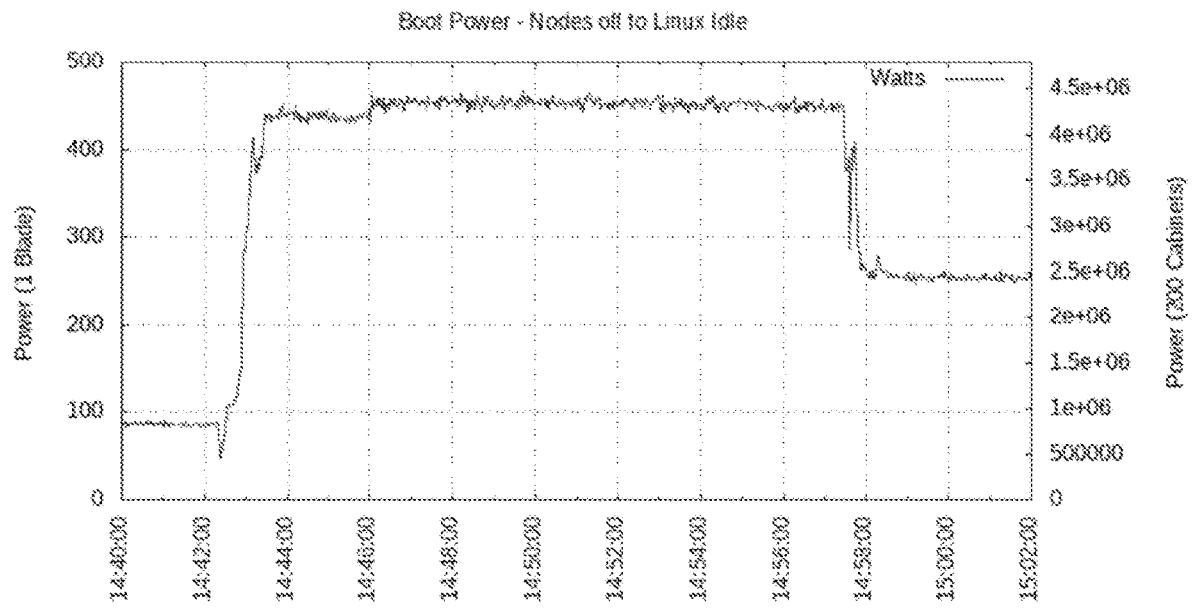

System boot up is also a complicated action which creates power consumption issues for large scale systems. One example of the power consumption during this system boot operation is illustrated in FIG. 7. As shown, two major power transitions occurred during system boot. The first occurs due to all nodes being powered on at a first point in time (see time 14:42:30). This is similar to the situation illustrated in FIG. 5 as discussed above. A second transition will then occur when all nodes have been powered on, the BIOS initialized, and the nodes reach an idle state (i.e. the OS, such as Linux, is brought up to an idle state). (See time 14:57:30).

Figure 8:
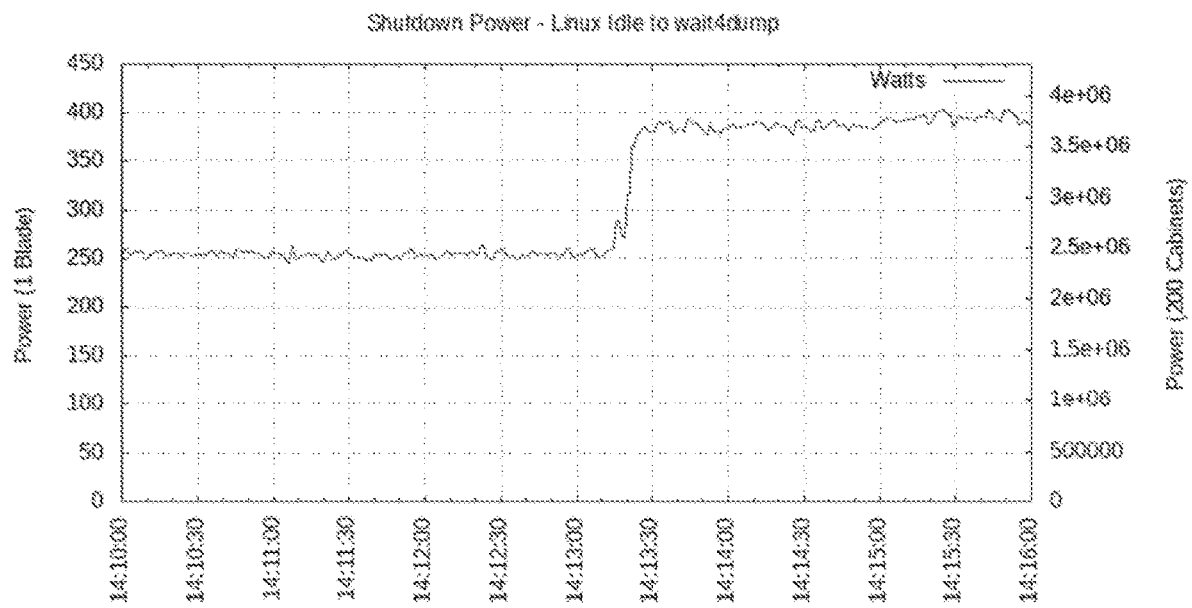

In the exemplary system involved, nodes are shut down occasionally, without powering them off. This is done for various reasons, including the support of potential system dumps. Significantly, this activity also creates a power transition which can be significant. More specifically, FIG. 8 illustrates a situation where all nodes are initially booted and maintained in as idle state, but then transition to a shutdown state. (See time 14:13:15). At that point in time, all nodes are shutdown (however, as illustrated the system consumes more power than while idle for several reasons beyond the scope of the present description). Importantly however, this illustrates yet another situation where a significant power transition occurs.

As the above referenced circumstances illustrate, there are several instances where overall system transitions or overall system operations can create significant power swings. As will be recognized, these potential instances could include booting up any combination of various system components, including but not limited to, a single node, a blade, a cabinet, an individual system, or all systems. Similarly, initializing a combination of components, such as single node, a blade, single cabinet, a system, or all systems, has the potential to create undesired power swings. Further, halt, reset or power down requests can potentially create undesirable power swings, whether operating at a node, blade, cabinet or system level. While this provides several examples, further situations or instances could exist. Although the various components making up a computing system could have different names or groupings, the examples listed above outline how undesired power swings can be generated by several sources. Despite the particular cause, these power swings can be undesirable and potentially detrimental from an overall system perspective. As such, a supervisory system is provided to manage these potentially detrimental circumstances.

As also illustrated above, several of the power transition issues or concerns are due to system commands issuing requests to all or a large portion of a computing system in one operation. For example, the power off illustrated situation in FIG. 3 and the power on situation illustrated in FIG. 4 provide such simultaneous requests. To minimize the detrimental effects of these requested operations, the supervisory system implements a process that monitors requests, and where the requests may have potential detrimental effects, the system fragments them into smaller and more manageable units. The supervisory system will also control the manner in which these requests are carried out, while also avoiding any negative effects on system operation in one embodiment. These smaller units, or fragments, are transmitted at a controlled rate, thus avoiding drastic or significant power changes in very short periods of time.

Figure 2:
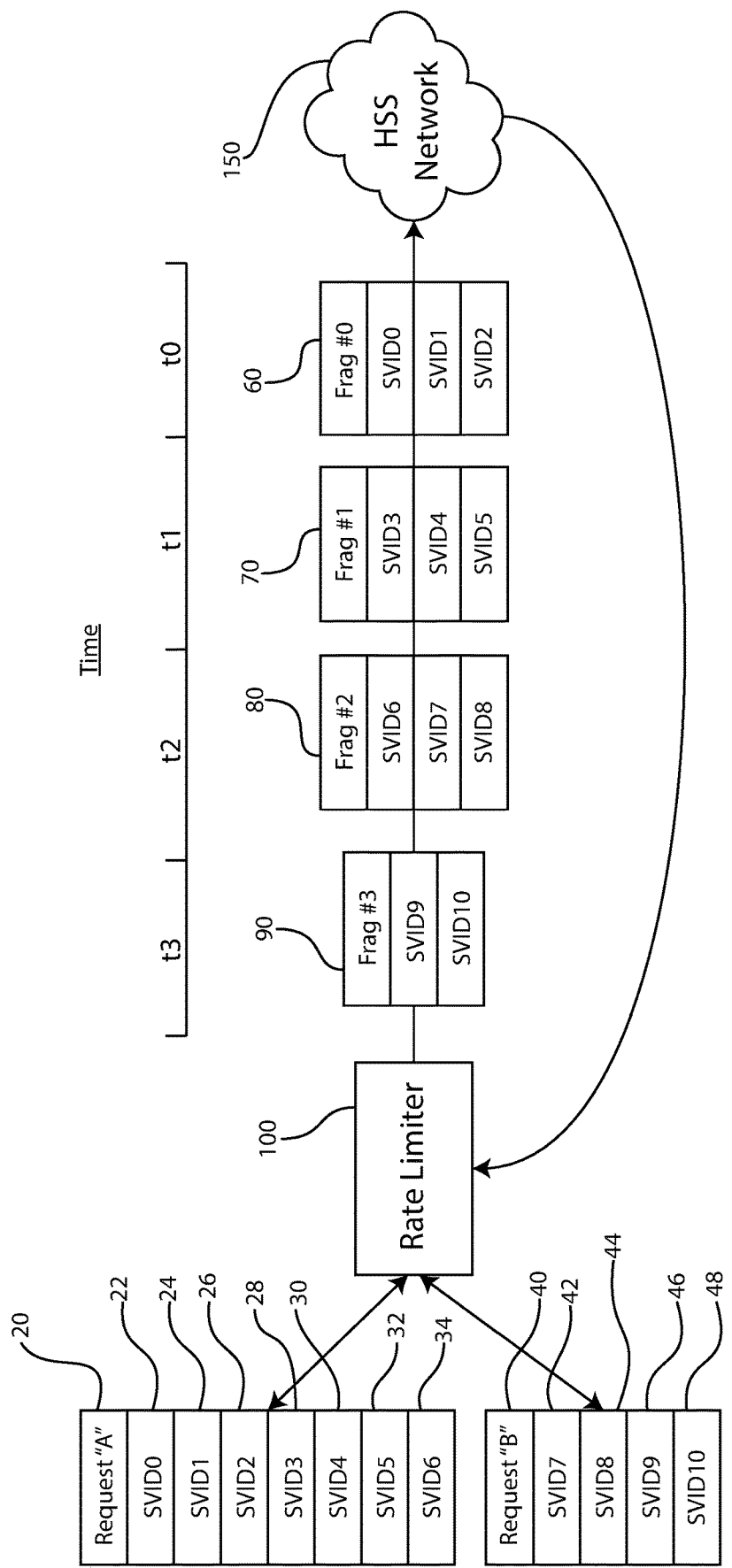
FIG. 2 is a graphical illustration showing the process flow utilized by the hardware supervisory system.

Referring now to FIG. 2, which schematically illustrates one embodiment of a supervisory system capable of carrying out the above referenced operations. As illustrated, supervisory system has a rate limiter 100 which is one of the primary components and which coordinates the handling of multiple requests. In this particular example, two requests are illustrated, shown here as "request A" 20 and "request B" 40. In this example embodiment, it is contemplated that request A 20 will include 7 different individual requests or segments, labeled as SVID0 22, SVID1 24, SVID2 26, SVID3 28, SVID4 30, SVID5 32, and SVID6 34. Similarly, request B 40 includes 4 individual requests or segments, labeled herein SVID7 42, SVID8 44, SVID9 46, and SVID10 48. Rate limiter 100 manages the receipt of these various requests, and partitions them into various fragments. In operation, rate limiter 100 then passes these fragments to a hardware supervisory system 150, which manages transmission to the appropriate components. As shown in this example, rate limiter 100 manages the timing of these fragments, so that the various service requests are staggered. As better illustrated in FIG. 2, fragment #0 60 is transmitted at a time t0. Similarly, fragment #1 70 is transmitted at t1; fragment #2 80 is transmitted at time t2; and fragment #3 90 is transmitted at time t3. In this manner, rate limiter 100 can monitor and control the rate at which requests are made to various components of the system, and various powered consuming activities occur.

Figure 1:
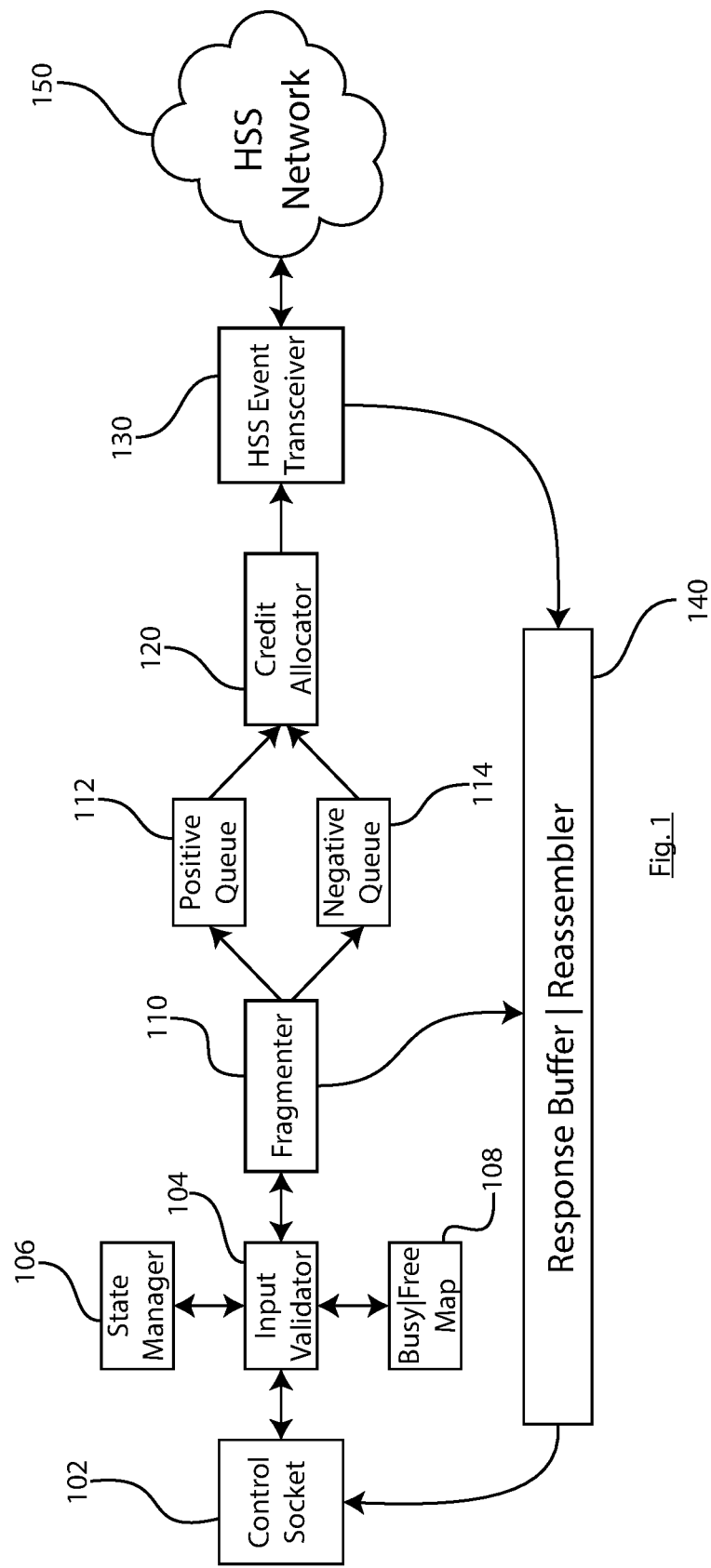
FIG. 1 is a schematic diagram illustrating the general content of the rate limiter.

Rate limiter 100 is made up of several components, which are better illustrated in FIG. 1. As shown, one of these components includes a control socket 102. Control socket 102 is a private interface which allows for the monitoring of requests in an efficient manner. Applications do not connect to control socket 102 directly, however the protocol within the system allow control socket 102 to monitor aforementioned requests. In addition, control socket 102 is thus capable of recognizing these requests and initiating further activity.

Once a request is recognized by control socket 102, it is validated using an input validator 104. Input validator 104 more specifically confirms that the targets are in a suitable state for the requested operation, the operation is applicable for all specified targets, and the requested targets are not currently undergoing a state transition. Naturally, further overall system characteristics could similarly be utilized for validation. In the present embodiment, all of these validation rules must be met in order to further initiate the request. If validated, the request will be accepted and the specified targets will then be flagged as busy, so further operations cannot be carried out. If these conditions are not met, the request is then rejected. As can be anticipated, a state manager 106 and a busy|free map 108 communicate with input validator 104, and are utilized to assess the validity of the specified request as mentioned above. The state manager 106 is somewhat self-explanatory in that it monitors and maintains records of the various states involved for each target. In a similar manner, busy|free map 108 provides a simple bit map structure to track the individual components such as cabinets, blades, nodes, etc. Utilizing this information, input validator 104 can efficiently and effectively carry out the above mentioned validation operations.

Incoming requests identified by control socket 102 may contain various types of desired commands. For example, these requests may include a request, directed toward every target within the system, or toward various subgroups. Alternatively, this may be applicable for only targets of a particular type. Based upon the type of request or designated command, fragmenter 110 will determine at which level the various requests can be split or divided. As will be appreciated, many different types of fragmentation rules, protocols, and processes can be implemented. As one extreme, the requests may be fragmented such that commands for only a single target are contained within each fragment. Naturally, other methodologies may be utilized to generate the appropriate fragments, such as all requests to a particular set of targets.

Once fragmented, the requests are placed in one of the queues: positive queue 112 or negative queue 114. In this embodiment, each of the fragments has an associated cost, dependent upon the specific operation and target count included. If the cost is greater than 0, the fragment is placed in the positive queue. If the cost is equal to or less than 0, it is placed in the negative queue. Beyond that, the queues simply involve a first in first out buffering mechanism.

Once the requests are validated and fragmented as outlined above, they are eventually fed to credit allocator 120. In the present embodiment, credit allocator 120 is the primary means of rate limiting which is carried out using a power credit allocation methodology. Credits are used to cover the power cost of a particular operation, where power cost is equal to the approximate power delta induced by the operation. Using this concept, operations are assigned a particular value in watts per target. The magnitude of this value is determined based upon the specific operation involved. Operations which result in an increase in power consumption require positive credits. Similarly, operations which result in a decrease in power consumption require negative credits. A decision is then made to delay or transmit the request, dependent upon a predetermined window. The maximum for the predetermined window is established as the fastest allowable ramp up, while the minimum is established as the lowest allowable ramp down rate.

Utilizing the credits mentioned above, credit allocator 120 periodically monitors both queues to determine if credits are available to cover an associated operation. If appropriate credits are available, the fragment is pulled from its queue and passed along to the hardware supervisory system event transceiver 130. In certain situations, positive and negative credits can offset one another, to maintain balance in the system. The request can then be transferred to the hardware supervisory system network 150 for further operation. Event transceiver 130 is primarily involved in the appropriate formatting to conform requests to existing protocols. Transceiver 130 also includes timing functions. As each event is transmitted, a response timer is started. If the timer expires, a timeout notification is placed in reassembler 140 for those particular targets. Utilizing this timer, the event transceiver 130 guarantees that response messages will not get stuck in reassembler 146 indefinitely.

Reassmbler 140 is generally a staging area which holds response status for the individual message fragments. When a complete response is assembled the associated busy signal for each target (discussed above in relation to control socket 102) is thus cleared. Once cleared, the request is considered completed thus allowing the response buffer/reassembler 140 to be cleared.

Using the rate limiter mentioned above, the system is capable of avoiding undesirable power consumption conditions. As timing is consistent and controlled, the system is thus capable of avoiding large and rapid power transitions without greatly effecting operation. Further, the system is capable of parsing fragments so that requests which are known to create undesirable power swings can be easily dealt with.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A supervisory system for managing power swings within computing systems having a plurality of computing devices housed within a plurality of cabinets, the computing devices capable of carrying out a plurality activities, the supervisory system comprising:
    a control socket monitoring requests for any of the plurality of activities within a network, wherein the network is which is configured to accommodate communication between the plurality of computing devices, and wherein each of the plurality of activities comprise actions to be carried out by at least one of the plurality of computing devices and, upon identification of said request for activity, analyzing the request to determine whether the request has the potential for an adverse power effect;
    a fragmenter in communication with the control socket, wherein identified requests which have been determined to have an adverse power effect will be fragmented into a plurality of segments;
    an event transceiver in communication with the fragmenter to transmit the plurality of segments to the network so that the segments are executed by the network in a predetermined manner which is dependent upon the determined adverse power effect, wherein the execution of the plurality of segments in the predetermined manner will reduce the adverse power effect on the computing system; and
    a reassembly buffer receiving feedback from the event transceiver and the fragmenter thus providing confirmation that the segment has been executed and providing feedback to the control socket.

2. The supervisory system of claim 1, further comprising a validator in communication with the control socket, the validator capable of confirming that the request is valid based upon a status of the network.

3. The supervisory system of claim 2 wherein the status of the network is monitored by a state manager and a busy/free map which are both in communication with the input validator.

4. The supervisory system of claim 1 further wherein the fragmenter further allocates the segments into a positive queue and a negative queue dependent upon a cost for the corresponding segment, wherein the cost is related to whether the adverse power effect of the related request has a positive cost or a negative cost.

5. The supervisory system of claim 1 wherein the predetermined manner for executing the plurality of segments involves the execution of a first subset within a first predetermined timeframe and the execution of a second subset within a second predetermined time.

6. The supervisory system of claim 5 wherein the first subset includes a first plurality of segments and the second subset includes a second plurality of segments.

7. The supervisory system of claim 5, wherein the first time period and the second time period are sequential.

8. The supervisory system of claim 1 wherein the requests are selected from the group of requests including boot up node, boot up all, boot up cabinet, boot up blade, initialize all, power up node, power up blade, power up cabinet, power up all, power down node, power down blade, power down cabinet, power down all, halt node, halt blade, halt cabinet, halt all, reset node, reset blade, reset cabinet, and reset all.

9. A method for coordinating several operational requests to various computing devices within a large scale computing system having a plurality of processors contained within a plurality of cabinets so as to avoid undesirable power swings within the computing system, comprising:
    monitoring the requests across the computing system, analyzing the requests to determine if they have an effect on overall system power, and extracting the requests which have been determined to have a potential effect on overall system power;
    parsing the extracted requests into a plurality of segments;
    further analyzing the plurality of segments to identify those segments which have a positive effect on system power and those which have a negative effect on system power, and subsequently queuing the segments with a positive effect in a positive queue and queuing the segments with a negative effect in a negative queue; and
    allocating the segments to be carried out based upon the identified positive effects or the identified negative effects, and transmitting the segments to a transceiver for communication to the computing system so the segments of the requests can be carried out in a predetermined manner so as to avoid the undesirable power swings within the computing system.

10. The method of claim 9 wherein the segments are transmitted at various time intervals so as to distribute the operations over a predetermined period of time.

11. The method of claim 9 wherein the transceiver further provides feedback which confirms issuance of the segments of the requests which were parsed, which will thus confirm completion.

12. The method of claim 9 wherein the segments can be aggregated into a plurality of groups, and wherein an individual group of segments can be carried out concurrently.

13. The method of claim 9 wherein the rate at which the segments are transmitted is limited to a predetermined rate.

14. The method of claim 12 wherein the rate at which the group of segments is transmitted is limited to a predetermined rate.

15. The method of claim 14 wherein the segments from the positive queue and the segments from the negative queue are alternated, thus providing a balancing of the positive effects and the negative effects.

16. A supervisory system for managing system power so as to avoid undesirable power swings during operation of a large scale computing system having a plurality of computing devices housed within a plurality of cabinets, the supervisory system comprising:
    a control socket monitoring requests for activities to be carried out during operation of the computing devices within the computing system and for analyzing the requests so as to identify those requests which have the potential for creating an effect on system power;
    a validator for determining the validity of the request and the ability for the computing device to carry out the requested activity as determined by a state manager and a busy/free map which are both in communication with the validator;

a fragmenter in communication with the control socket, wherein requests determined to effect system power consumption will be fragmented into a plurality of segments and the segments having a positive power consumption cost will be queued in a positive queue or the segments having a negative power consumption cost will be queued in a negative queue;

an event transceiver in communication with the fragmenter to transmit the plurality of segments to the network so that the segments are executed by the network in a manner which balances the overall effect of the segment on overall system power needs, wherein the execution of the plurality of segments will be carried out in a time controlled manner with only a sub-group of the plurality of segments being carried out concurrently to thus reduce the negative power effect on the computing system; and a reassembly buffer receiving feedback from the event transceiver and the fragmenter thus providing confirmation of the completion of the segment and feedback to the control socket.

17. The supervisory system of claim 16 wherein the request are selected from boot up node, boot up all, boot up cabinet, boot up blade, initialize all, power up node, power up blade, power up cabinet, power up all, power down node, power down blade, power down cabinet, power down all, halt node, halt blade, halt cabinet, halt all, reset node, reset blade, reset cabinet, and reset all.

\* \* \* \* \*